United States Patent [19]

Iijima et al.

[11] Patent Number: 4,941,347

[45] Date of Patent: Jul. 17, 1990

[54] TURNTABLE-USING TESTING APPARATUS

[75] Inventors: Takashi Iijima, Iruma; Takeshi Matsui, Fujimi; Shigeru Kaneto, Osaka; Kenji Horio, Sakai; Toshihiko Kato, Hawata, all of Japan

[73] Assignees: Honda Giken Kogyo Kabushiki Kaisha; Daifuku Co., Ltd., both of Japan

[21] Appl. No.: 381,752

[22] Filed: Jul. 18, 1989

[30] Foreign Application Priority Data

Aug. 25, 1988 [JP] Japan .............................. 63-212274
Aug. 25, 1988 [JP] Japan .............................. 63-212275

[51] Int. Cl.$^5$ ............................................ G01M 15/00
[52] U.S. Cl. .................................................. 73/116
[58] Field of Search ................ 73/116, 117.2, 117.3; 198/339.1, 340, 341, 345, 346.1; 324/73 AT

[56] References Cited

U.S. PATENT DOCUMENTS

4,285,233 8/1981 Swis ...................................... 73/116

*Primary Examiner*—Robert Raevis
*Attorney, Agent, or Firm*—Barnes, Kisselle, Raisch, Choate, Whittemore & Hulbert

[57] ABSTRACT

The invention concerns a turntable-using testing apparatus suitable for use in carrying out performance test of, for example, an internal combustion engine. The apparatus has testing units radially arranged on a turntable, each testing unit having a computer, table-side connectors connected to individual computers, a transfer device provided outside the turntable for delivering an object to be tested onto and withdrawing same from one of the testing units, and ground-side connectors connectable to and disconnectable from the table-side connectors and connected to the host computer. The apparatus enables prompt transmission/reception of test data and the like, facilitates correction of troubles and/or failures, and permits mass signal transmission and reception. According to another aspect of the invention, each of the testing units arranged on the turntable has a testing device, a control section, and a display, so that test data received from the testing device into the control section can, in combination with decision data thereof, be displayed on the display unit.

8 Claims, 13 Drawing Sheets

TURNTABLE-USING TESTING APPARATUS

FIELD OF THE INVENTION

The present invention relates to a testing apparatus using a turntable which is employed for example, in an automobile assembly plant in carrying out a performance test with respect to an internal combustion engine prior to being incorporated into an automotive body.

BACKGROUND OF THE INVENTION

Conventionally, a testing apparatus for internal combustion engines is such that an internal combustion engine is placed on a pallet and delivered together with the pallet to a testing unit and, after being subjected to the required performance test, it is removed, together with the pallet, from the testing unit. Known testing apparatuses of this sort include those of the turntable system and those of the in-line system. These known systems have the following drawbacks, which will be more fully discussed hereinafter with reference to some of the accompanying drawings.

In the case of the turntable system, a signal transmitter-receiver unit for signals necessary for operating the testing apparatus is centrally provided on the turntable, and therefore the turntable must be large enough to provide the space for the transmitter-receiver unit, with the result that the apparatus as a whole is considerably expensive. Another problem with the turntable system is that signal transmission/reception is made through a trolley type arrangement which cannot perform any mass transmission/reception; therefore, only operating signals for the testing apparatus can be sent and received and no test data can be sent/received. As such, large amounts of data must be stored in testing sections on the turntable, which means that the testing sections are large-sized and costly.

These problems can be solved by employing the in-line system, but this in-line system involves long lines of testing units, which naturally means longer time required for transmission and reception, a larger number of wire connections involved, and longer time required for repair in case of trouble or failure. Furthermore, since all test data are sent to a control unit remote from the testing sections, operators engaged in testing operation at the testing sections cannot grasp the details of the data and, therefore, they cannot promptly react to any defective products or the like.

SUMMARY OF THE INVENTION

It is an object of the present invention to provide a testing apparatus using a turntable which involves less space between adjacent testing units, permits more rapid signal transmission and reception, involves less wiring, and requires less time in correcting troubles or the like, and yet which is simplified in construction with respect to the arrangement on the turntable and well adapted for mass signal transmission and reception.

It is another object of the invention to provide a testing apparatus using a turntable which enables operators engaged in testing operation at testing units to visually confirm testing data in sequence and thereby to promptly take proper action with respect to defective products.

In order to accomplish the aforesaid objects, the invention provides a turntable-using testing apparatus comprising a turntable, testing units disposed at a plurality of circumferential locations on the turntable and individually having computers, table side connectors disposed at a plurality of locations in a peripheral edge portion of the turntable and individually connected to the computers, a transfer device provided outside the turntable for transferring an object to be tested onto one of the testing units and removing the object from the testing unit, a host computer spaced apart from the turntable, and a ground-side connector connectable to and disconnectable from the table-side connectors and connected to the host computer.

According to such arrangement of the invention, each object to be tested, or an internal combustion engine, is transferred by the transfer device to one of the testing units, and as it moves in rotation with the turntable, the internal combustion engine undergoes the required performance tests; and after practically one rotational movement, it is removed by the transfer device from the testing unit. After the internal combustion engine has gone through the required performance tests and until it is removed by the transfer device, one of the table-side connectors is brought in opposed relation to the ground-side connector so that signal transmission and reception are carried out between the connectors, whereby test data signals and operating signals are transmitted and received.

According to another aspect of the invention, a turntable-using testing apparatus is provided which comprises a turntable and testing units disposed at a plurality of circumferential locations on the turntable, each of said testing units having testing means, a control section comprising a computer for controlling by the control section, each of said testing units being of such arrangement that said control section combines the test data inputted from said testing means with decision data with respect to the test data and causes the combined data to be displayed on the display unit.

According to such arrangement of the invention, each object to be tested, or an internal combustion engine, is transferred to one of the testing units, and as it moves in rotation with the turntable, the internal combustion engine undergoes the required performance tests; and after practically one rotational movement, it is removed from the testing unit. The computer of the control section combines test data received from the testing means with decision data with respect to the test data and causes the combined data to be displayed on the display unit, so that the operator present adjacent the testing unit can visually confirm the test data on the object being tested and give decision as to what to do accordingly.

BRIEF DESCRIPTION OF THE DRAWINGS

FIGS. 1 through 12, inclusive, illustrate one embodiment of the present invention:

DESCRIPTION OF THE PREFERRED EMBODIMENTS

Before the embodiments of the invention are described, the prior art arrangements will be discussed in further detail with reference to FIGS. 13 and 14.

Figure 13:
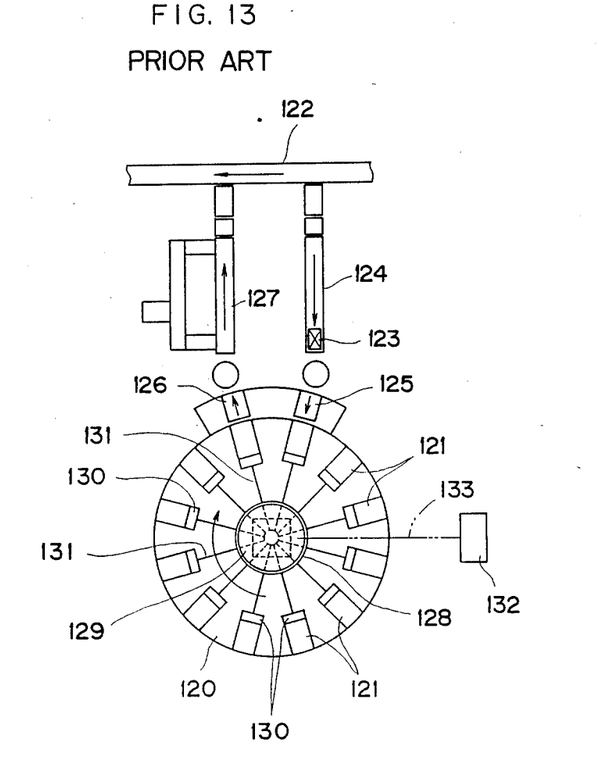
FIGS. 13 and 14 are schematic plan views showing prior-art arrangements.
Figure 14:
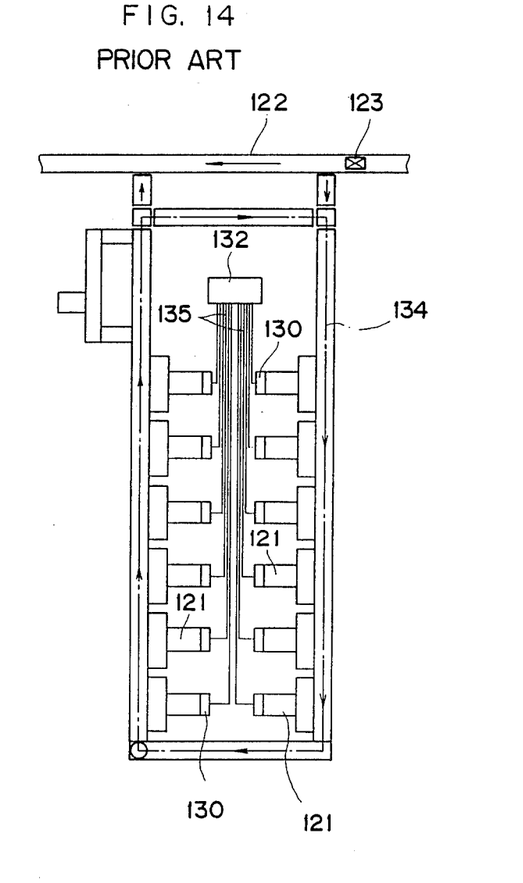

As already stated, there have hitherto been known testing apparatuses for internal combustion engines, including, for example, those of the turntable system shown in FIG. 13 and those of the in-line system shown in FIG. 14. In the first mentioned turntable system, a plurality of testing units 121 are arranged on a turntable 120; and an internal combustion engine 123, when it is conveyed on a main conveyor 122, is delivered through a carry-in conveyor 124 or the like to an incoming transfer device 125, which in turn delivers the internal combustion engine 123 to one of the testing units 121. The turntable 120 is driven to perform intermittent rotation so that predetermined performance tests are carried out with respect to the internal combustion engine 123 while the turntable 120 makes one turn. Subsequently, the internal combustion engine 123 is removed from the testing unit 121 by an outgoing transfer device 126 and then delivered through a carry-out conveyor 127 to the main conveyor 122. Transmission and reception of operating signals for a lift device in each testing unit 121 and of those for taking in and out are carried out by means of a trolley-type signal transfer device provided between a table-side transmitter/receiver unit 128 centrally disposed on the turntable 120 and ground-side transmitter/receiver 129 disposed in opposed relation thereto on the ceiling side, the table-side transmitter/receiver unit 128 being connected at 131 to a testing section 130 of each testing unit 121, the ground-side transmitter/receiver unit 129 being connected at 133 to a control unit 132.

According to the second mentioned in-line system, an internal combustion engine transported along on the main conveyor 122 is transferred onto a carriage which, in turn, delivers it to one of testing units 121 arranged alongside a circulation path 134 while the carriage travels on the circulation path 134. After having gone through the predetermined performance tests, the internal combustion engine 123 is fetched onto the carriage, which in turn transfers same onto the main conveyor 122 as it travels along the circulation path 134. In this case, transmission and reception of various kinds of operating signals or test data signals is carried out by connection 135 between a testing section 130 and a control unit 132.

As earlier stated, however, these prior art arrangements have not been found to be satisfactory.

One embodiment of the present invention will now be described with reference to FIGS. 1 through 12, inclusive.

Figure 1:
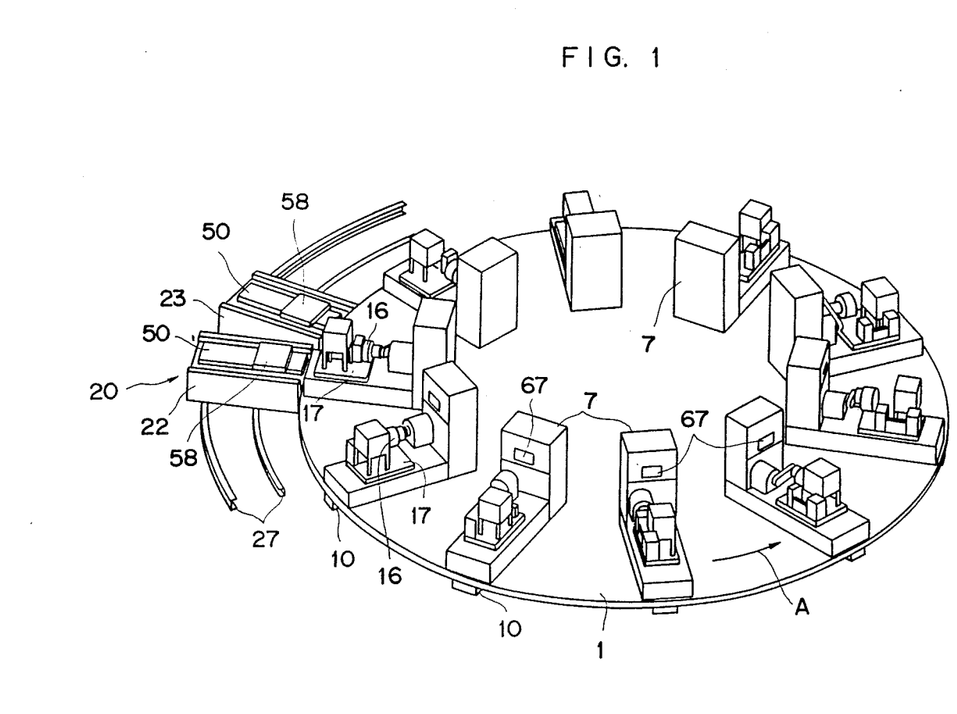
FIG. 1 is a general schematic perspective view of the embodiment.
Figure 11:
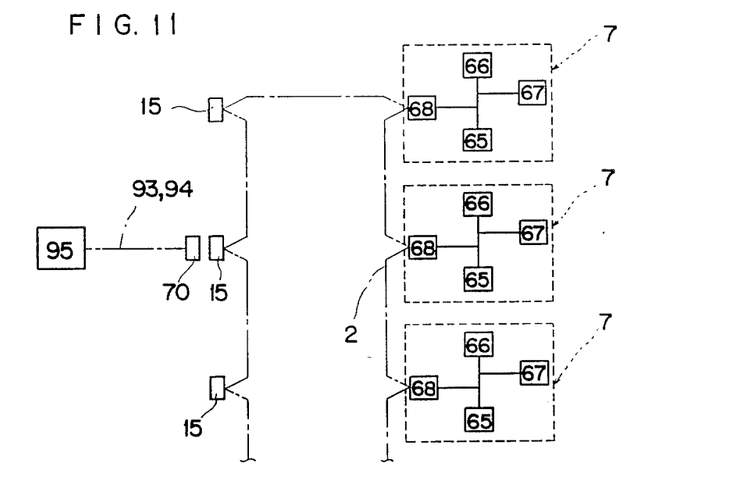
FIG. 11 is an explanatory circuit diagram.

Numeral 1 designates a turntable which is supported and guided, through a plurality of wheel members 4, on annular rails 3 mounted on a base frame. A chain device 5 is mounted to the underside of a peripheral edge portion of the turntable 1 and engaged by drive means 6. Therefore, the turntable 1 is continuously rotatable about a vertical axis at constant speed. Testing units 7 are radially arranged on the turntable 1 at a plurality of locations spaced a predetermined angle in the circumferential direction (10 locations spaced apart at 36° intervals in this embodiment). Each of the testing units 7 includes testing means 65 (as shown in FIG. 11), a control section 66 comprising a computer for controlling the testing means 65, a display unit 67 controlled by the control section 66, and an interface portion 68. Blocks 10 are mounted to the outer periphery of the turntable 1 at locations corresponding to the individual testing units 7 and, on the outer surface of each of the blocks 10 at opposite ends thereof in the direction of rotation A, positioning cylindrical members 11 extend laterally outwardly. An engagement member 12 is disposed below one of the positioning cylindrical members 11 of each block 10 which is located at the upstream side as viewed in the direction of rotation A of the turntable 1. A table-side exhaust gas connector 13 for exhaust gas removal is provided adjacent the downstream-side positioning cylindrical member 11, and a table-side oil connector 14 for engine oil removal is provided adjacent the engagement member 12. Disposed at two locations between the two connectors 13, 14 are table-side connectors 15 for signal transmission and reception, which are connected to each interface portion 68 through a transmission cable 2.

Figure 9:
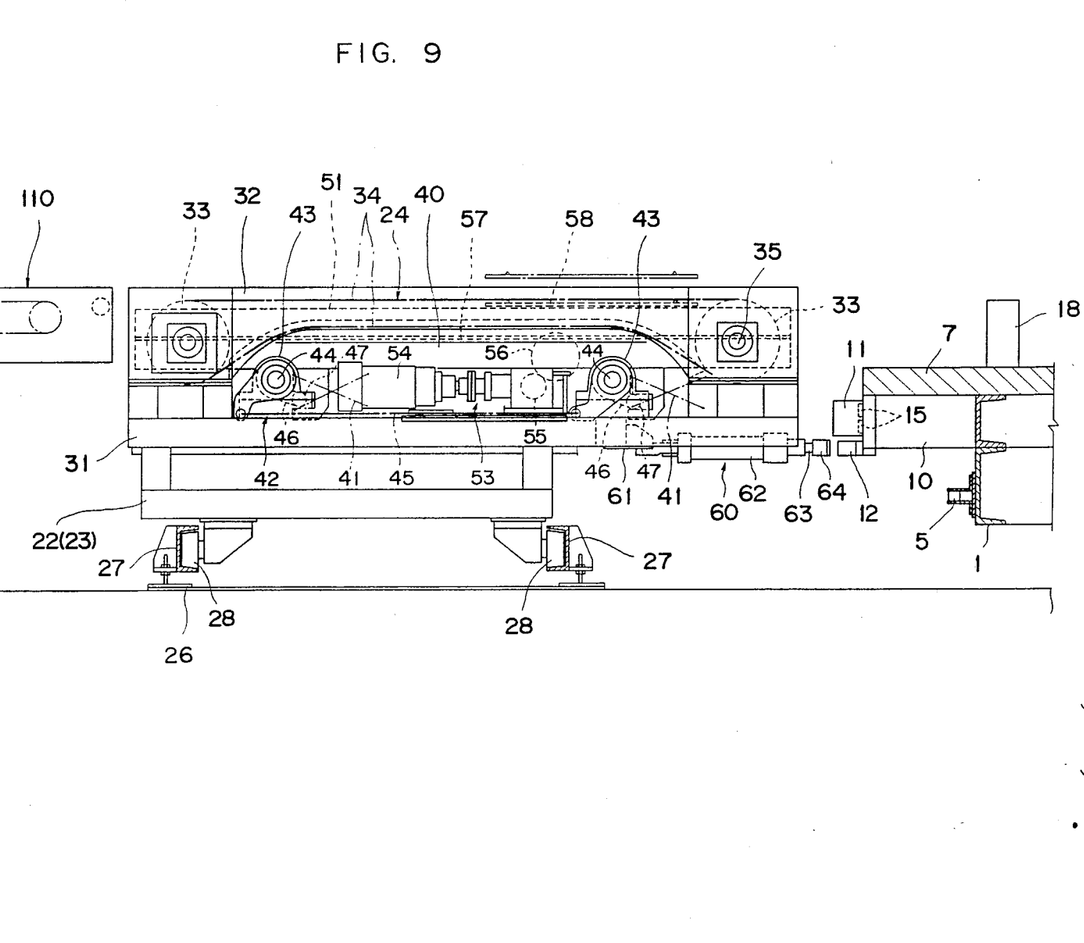
FIG. 9 is a front view thereof.

An internal combustion engine 16, shown by way of example as an object to be tested, is handled through the intermediary of a pallet 17. Each testing unit 7 is provided with a pallet stopper 18 (as shown in FIG. 9) which stops the pallet 17 directly.

Figure 2:
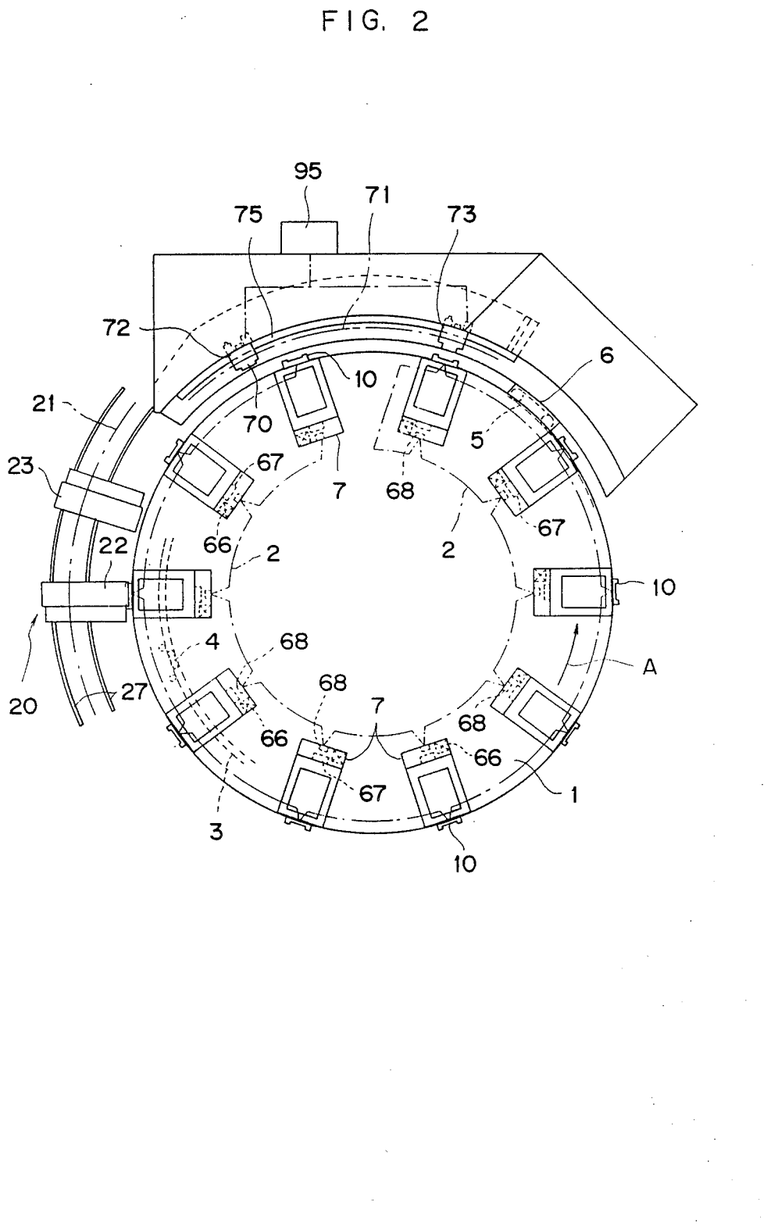
FIG. 2 is schematic plan view thereof.

Disposed outside the turntable 1 are a transfer device 20 for transferring the object to be tested onto the testing unit 7 and ground-side connectors 70 which are connectable to and disconnectable from the table-side connectors 15. The transfer device 20 has a carry-in carriage 22 and a carry out carriage 23 which are both reciprocably movable on an arcuate travel path 21 running along the outer periphery of the turntable 1. Transfer units 24, 25 are respectively disposed on the carriages 22, 23. The travel path 21 comprises a pair of arcuate floor rails 27, right and left, laid on a base frame 26.

In FIGS. 7 through 10, inclusive, the carry in carriage 22 is supported and guided on the floor rails 27 through a plurality of wheels 28 and is driven to run by means of a cylinder device 30 provided between the carry-in carriage 22 and the base frame 26.

Figure 8:
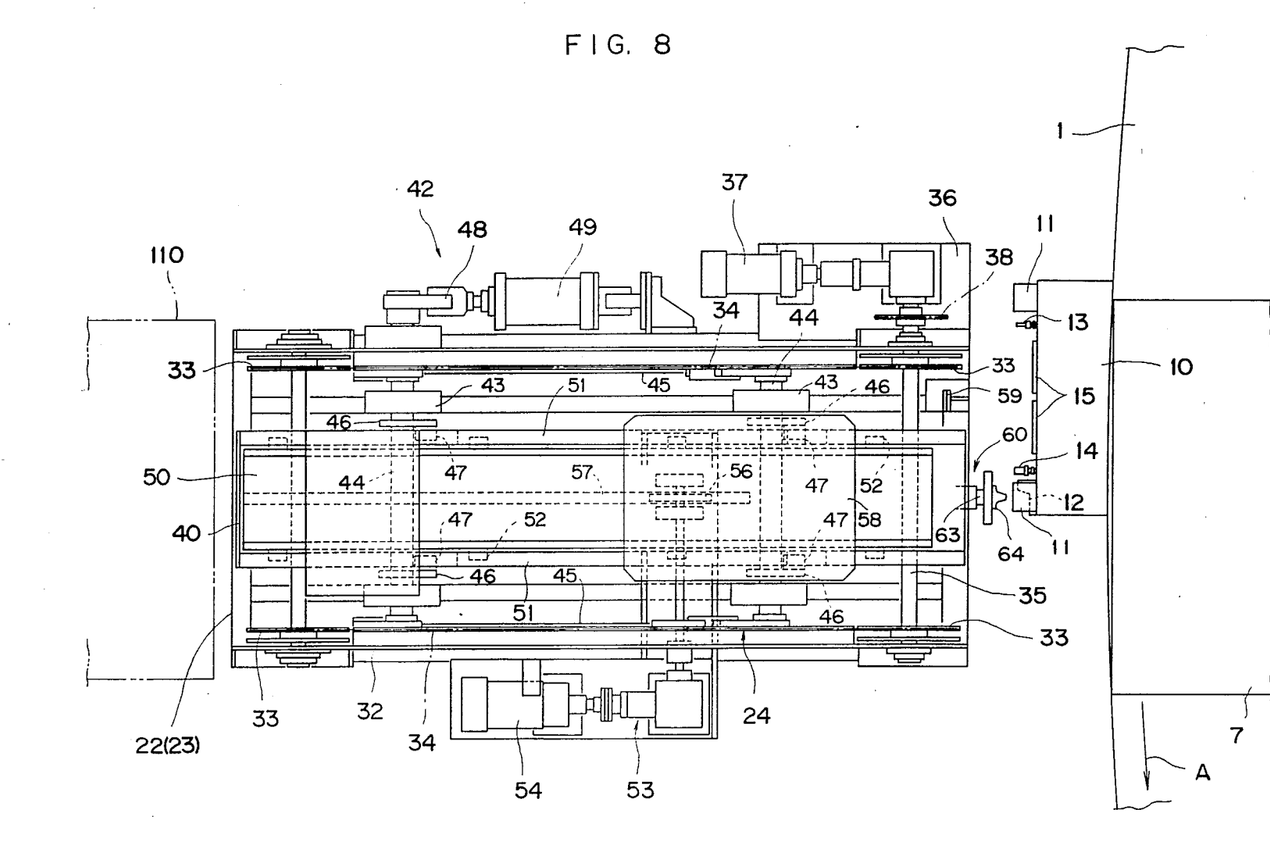
FIG. 8 is a plan view of a carry-in carriage.
Figure 10:
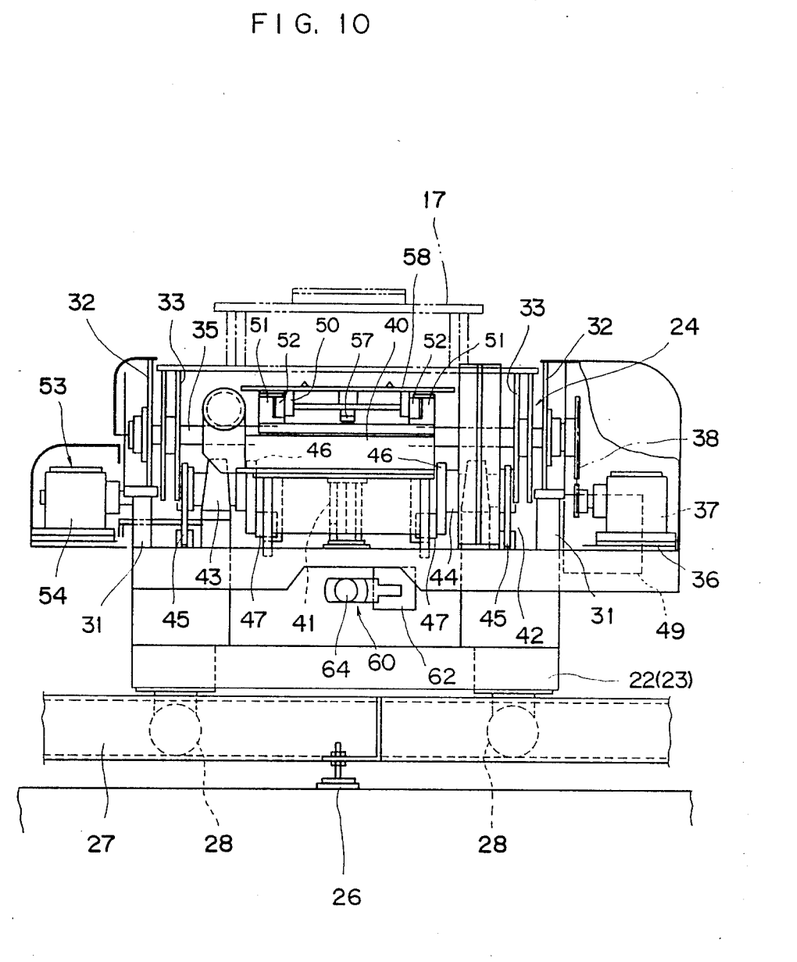
FIG. 10 is a side view thereof.

The transfer unit 24 is disposed on the top of the carry-in carriage 22 through a support frame 31, and it comprises a pair of longitudinally extending frames 32, front and rear, mounted on the top of the support frame 31, sprockets 33 mounted to opposite ends of the frames 32, a pair of chains 34 which are each trained over the corresponding pair of opposed sprockets 33, a drive shaft 35 on which is mounted the pair of sprockets 33 adjacent the turntable 1, a drive unit 37 mounted on a base 36 integral with the carry-in carriage 22, and a wrapping connector 38 for interlockingly coupling the drive unit 37 to the drive shaft 35. A lift plate 40 is provided between the two chains 34; and between the lift plate 40 and the carry-in carriage 22 are provided a pair of pantograph mechanisms 41, right and left, for guiding and moving the lift plate 40 in vertical directions, and up-and-down movement drive means 42. The up-and-down movement drive means 42 comprise a pair of longitudinally extending shafts 44, right and left, each being supported through a bearing 43 at a location adjacent the carry-in carriage 22, a pair of link mechanisms 45, front and rear, for actuating the longitudinally extending shafts 44 to rotate in synchronism with each other, a pair of links 46, front and rear, mounted to each of the shafts 44, rollers 47 mounted to free ends of the links 46, and a cylinder device 49 adapted to cooperate with lever 48 mounted to one of the shafts 44, the rollers 47 being in contact from below with the underside of the lift plate 40.

Forks 50 which are retractably movable in lateral directions are provided on the lift plate 40. These forks 50 are supported and guided, through a plurality of rollers 52, on a pair of guide rails 51, front and rear, provided adjacent the support frame 31. Drive means 53 for projection and retraction of the forks 50 comprise a motor 54 mounted on the lift plate 40, a drive gear 55 mounted to an output shaft of the motor 54, a pinion 56 engageable with the drive gear 55 and rotatably supported on the lift plate 40 side, and a rack 57 mounted to the underside of the fork 50 for engagement from above with the pinion 50 at the side adjacent the turntable 1. An upwardly extending stopper 59 is provided at one end of the frame 32 which is adjacent to the turntable 1.

An engaging device 60 which is engageable with and disengageable from the engagement member 12 is provided on the side of the carry-in carriage 22. On the turntable 1 side of the carry-in carriage 22 there is mounted a cylinder device 62 through a support member 61 so that an engagement member 64 mounted to a piston rod 63 of the cylinder device 62 is movable toward and away from the outer periphery of the turntable 1. Therefore, through pushing-forward and retracting motion of the piston rod 63 of the cylinder device 62, the engaging device 60 can be brought into engagement with and disengaged from the engagement member 12.

Figure 7:
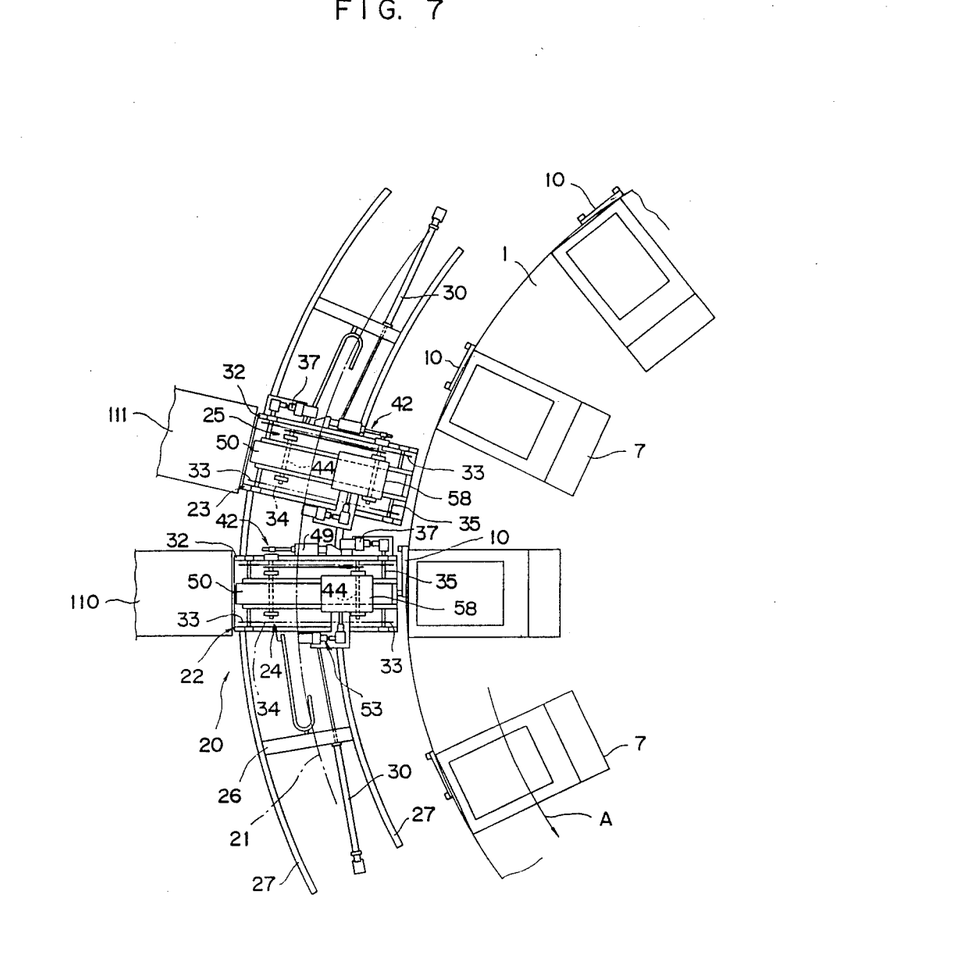
FIG. 7 is a plan view of a transfer section.

The carry-out carriage 23 is essentially same in construction with the carry-in carriage 22; therefore parts and components thereof which are similar to those of the latter are designated by identical reference numerals, description thereof being omitted herein. The two carriages 22, 23 are only different in the position and direction of operation of drive unit 37 and cylinder device 49.

The ground-side connectors 70 are provided on a pair of movable structures 72, 73 which are reciprocally movable on an arcuate travel path 71 running along the outer periphery of the turntable 1.

As FIGS. 2 through 5, inclusive, show, the travel path 71 comprises a rectangular tube-shaped duct 75 provided on a base frame 74 and extending in arcuate pattern, and a pair of guide rails 76, upper and lower, placed on the duct 75 and extending in arcuate pattern. The movable structures 72, 73 are supported and guided on the pair of guide rails 76 through a plurality of wheels 77 and a plurality of guide rollers 78 and are movable through chain wheels 80 driven by an air motor 70 with a reduction gear which is mounted on each of the movable structures 72, 73, each of the chain wheels 80 being held in engagement with a chain element 82 mounted through a support member 81 to the duct 75.

Figure 3:
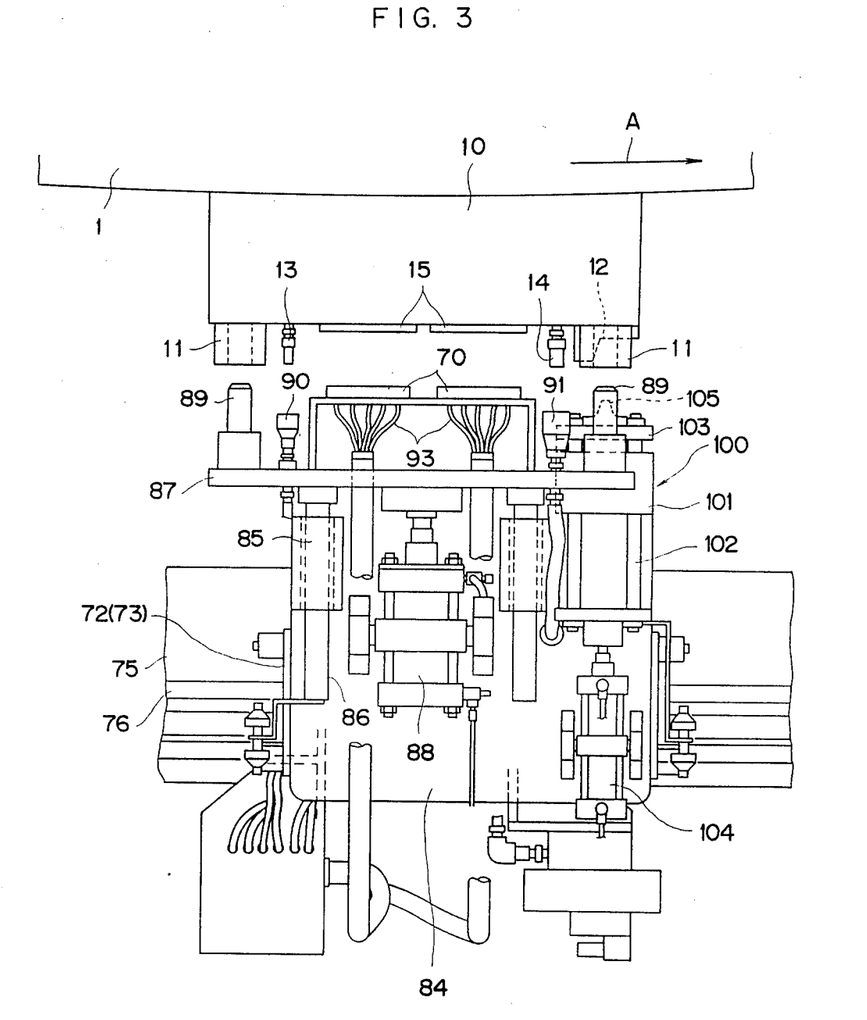
FIG. 3 is a plan view showing an optical transmission system.
Figure 4:
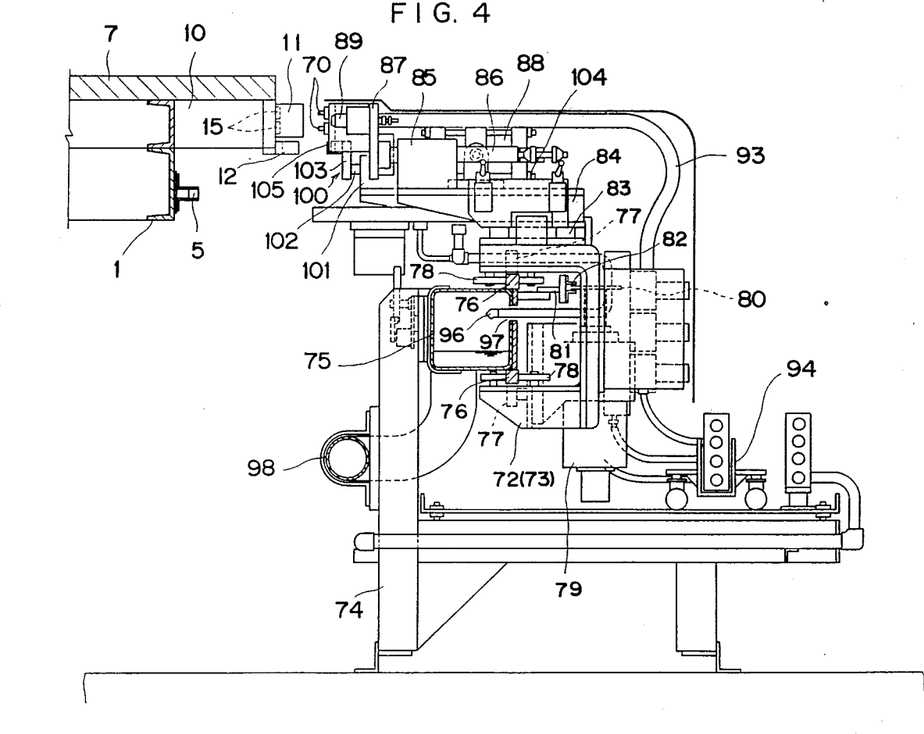
FIG. 4 is a front view thereof.
Figure 5:
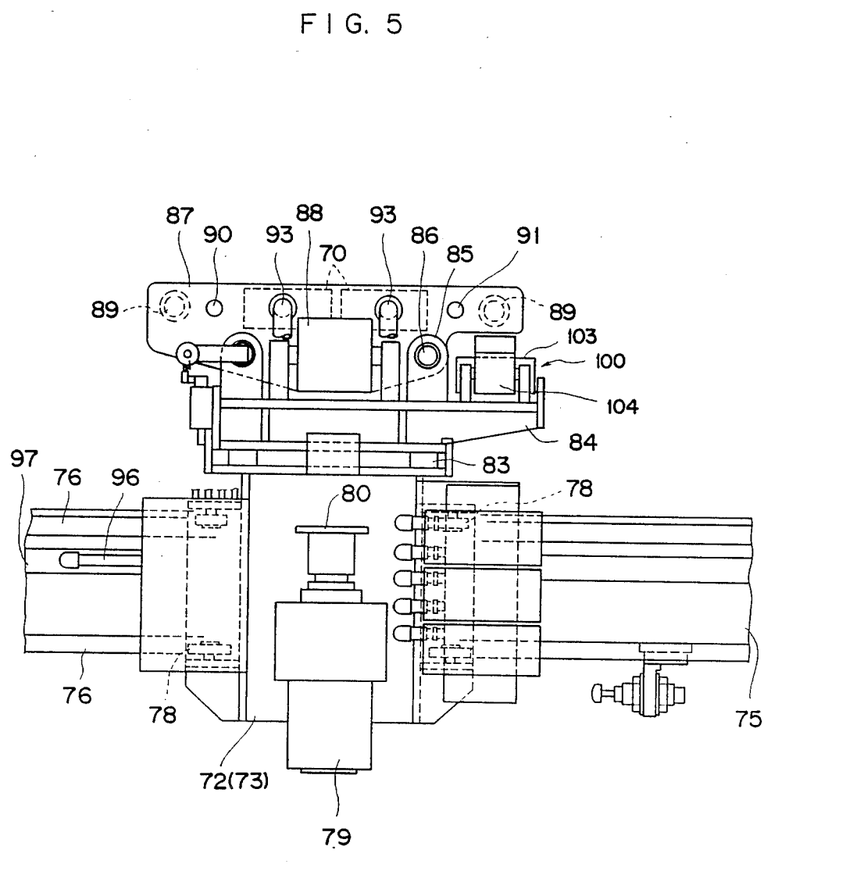
FIG. 5 is a side view thereof.
Figure 6:
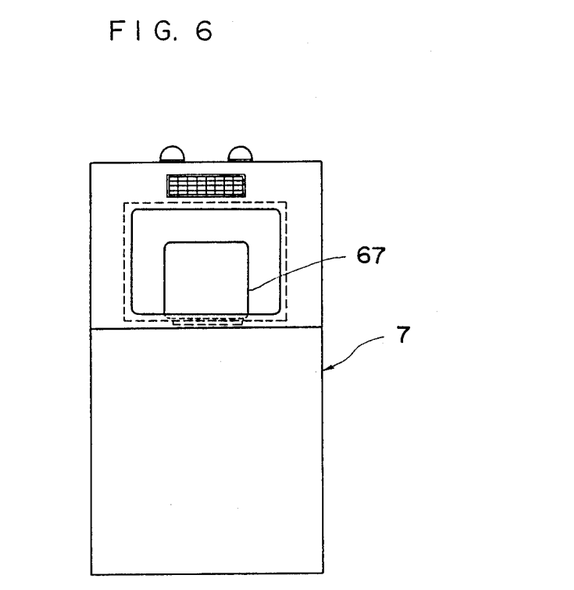
FIG. 6 is a front view of a testing unit.

A support base 84 is placed on each of the movable structures 72, 73 through an anti-vibration rubber member 83, and on this support base 84 a movable plate 87 which is movable toward and away from the outer periphery of the turntable 1 through a guide mechanism comprising a cylindrical member 85 and a guide rod 86, a cylinder device 88 being disposed between the support base 84 and the movable plate 87. A positioning pin 89 extends from the surface of movable plate 87 which faces the turntable 1, the pin 87 being plungible into and retractable from the positioning cylinder 11. Further, provided on the movable plate 87 are a ground-side exhaust gas connector 90 connectable to and disconnectable from the table-side exhaust gas connector 13, and a ground-side oil connector 91 connectable to and disconnectable from the table-side exhaust gas connector 13, and a ground-side oil connector 91 connectable to and disconnectable from the table-side oil connector 14. Also disposed on the movable plate 87 is the ground-side connector 70 which is connectable to and disconnectable from the table-side connector 15, and a cable 93 connected to the ground-side connector 70 is connected to host computer 95 through a cable support 94 and the like. Therefore, a control section 66 of each testing unit 7 ca be connected to the host computer 91 through the connectors 15, 70 and the like. A drain oil nozzle 96 communicating with the ground-side oil connector 91 passes through a slit 97 into the duct 75 thereby to cause the interior of the duct 75 to serve as an oil tank, a drain oil pipe 98 being connected to the duct 75.

On the support base 84 of each of the movable structures 72, 73 there is provided an engaging means 100 which is engageable with and disengageable from the engagement member 12. That is, the support base 84 is provided thereon with a mounting plate 103 which is movable toward and away from the outer periphery of the turntable 1 through a guide mechanism comprising a cylinder 101 and a guide rod 102, a cylinder device 104 being provided between the rear end of the guide rod 102 and the support base 84. An engagement projection 105 extends from a front portion of the mounting plate 103, the engagement projection 105 being engageable with and disengageable from the engagement member 12.

Provided outside the transfer device 20 are a carry-in device 110 to which the outer end of the carry-in carriage 22 is connectable and a carry-out device 111 to while the outer end of the carry-out carriage 23 is connectable. Each of these devices comprises a lift unit, a conveyor unit, and the like.

Nextly, the manner of operation of the above described embodiment in testing internal combustion engines will be explained.

A pallet 17 on which an internal combustion engine is supported is now at the delivery position (terminal position) on the carry-in device 110. The carry-in carriage 22 is driven by the cylinder device 30 to run toward the carry-out carriage until it stops opposite the carry-in device 110. Thereupon, on the carry-in carriage 22, the fork 50 retracts so that it is positioned within the space of the lift plate 40, and the lift plate 40 is lowered so that the load receiver plate 58 is positioned below the transport plane of the chain 34. In this condition, the pallet 17 is delivered forward from the carry-in device 110 and carried inward as it is supported by the chain 34 being driven, the pallet 17 being then brought into abutment against the stopper 59 so that it is caused to stop at a level above the load receiver plate 58. Subsequently, while the cylinder device 30 is held in free condition, the cylinder unit 62 of the engaging device 60 is driven into stretch movement and the engagement member 64 is advanced to a position adjacent the outer periphery of the turntable 1. Then, the engagement member 12, as it travels in conjunction with rotation A of the turntable 1, goes into engagement with the engagement member 64. Thereafter, the force of rotation of the turntable 1 is transmitted from the engagement member 12 to the carry-in carriage 22 through the engagement member 64 and the like, so that the carry-in carriage 22 is allowed to move along the travel path 21 in integral relation with the turntable 1 while it is held right opposite to one of the testing units 7.

When such integral movement begins to take place, the cylinder device 49 is first actuated to rotate the longitudinally extending shafts 44 in synchronism with each other through the lever 48 and link mechanism 45, thereby moving the roller 47 upward through the links 46. Accordingly, the lift plate 40 moves upward and, in this case, the panthograph mechanism 41 elevates it vertically. The lift plate 40 elevates the fork 50 integrally therewith, and accordingly the load receiver plate 58 goes into engagement with the underside of the pallet 17 to lift the pallet 17 from the chain 34. Nextly, the motor 54 is driven to cause the fork 50 to project via the drive gear 55, pinion 56, and rack 57 so that the pallet 17 is positioned above the pallet receiver 18. Then, the fork 50 is retracted. The carry-in operation has now been completed. Subsequently, the engagement member 64 is retracted to thereby disengage the carry-in carriage 22 from the turntable 1. The carry-in carriage 22, thus made free, is driven by the cylinder device 30 to return to its original position, being caused to stop opposite the carry-in device 110.

The internal combustion engine 16 which has been delivered onto the pallet receiver 18 and positioned as above mentioned is subjected to the predetermined tests while it makes one round trip together with the turntable 1, and test data is entered into the control section 66.

Figure 12:
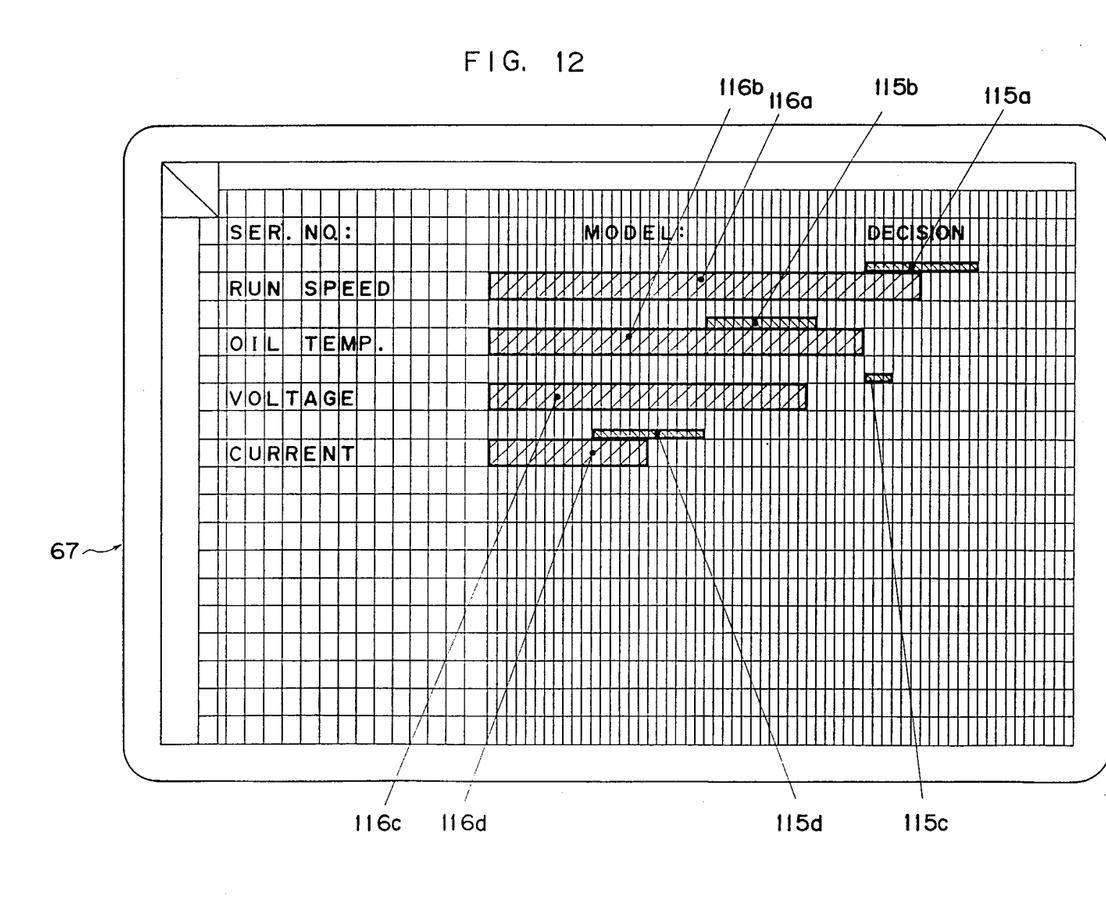
FIG. 12 is an explanatory chart illustrative of display by a display unit.

As above stated, while various performance tests are carried out with respect to the internal combustion engine 16, test data on the engine 16 is inputted from the testing means 65 to the control section 66, and the test data, in combination with corresponding decision data stored in the control section 66, is displayed on the display unit 67. As FIG. 12 shows, serial number and model of the internal combustion engine are displayed on the display unit 67. Further, with respect to various test items, such as run speed of the engine, oil temperature, voltage, and current, corresponding decision data 115a, 115b, 115c, 115d . . . are indicated in terms of tolerance limits, and individual test data are indicated in the form of bar charts. At least test data 116a, 116b, 116c, 116d . . . are indicated in color. For example, in comparison with decision data 115a, 115b, 115c, 115d . . . , test data 116a, 116b, 116d . . . within the tolerance limits are displayed in blue color, while test data 116c beyond the tolerance limits is displayed in red color. Also, a total decision is indicated. Therefore, the operator can visually confirm the test data on the internal combustion engine 16 under test, and accordingly he can decide whether the engine 16 is defective or not, and whether subsequent tests should be made or not. Further, indications on the display unit 67 changes into self-diagnosis characters and otherwise.

In addition to such control, test data signals and/or signals for operatIng the test apparatus are exchanged between the control section 66 and the host computer 95 through the interface 68 or the like. The movable structure 72 is driven by the air motor 79 to run in the opposite direction to the direction of rotation A and is then brought to a stop. The movable plate 87 is moved away through the contraction of the cylinder device 88, and the engagement projection 105 is retracted through the contraction of the cylinder device 104. Then, While the air motor 79 is held in free condition, the cylinder device 104 of the engaging device 100 is advanced and the engagement projection 105 is advanced to a position adjacent the outer periphery of the turntable 1. Thereupon the engagement member 12, as it travels in conjunction with the rotation A of the turntable 1, goes into engagement with the engagement projection 105; and subsequently the force of rotation of the turntable 1 is transmitted from the engagement projection 105, so that the movable structure 72 is allowed to travel along the travel path 71 integrally with the table 1 while it is roughly held in opposed relation to the testing unit 7.

When such integral movement begins to take place, the cylinder device 88 is first actuated to advance the movable structure 87. Then, the positioning pin 89 which is in advance movement integrally with the movable plate 87 plunges into the positioning cylinder 11, so that the movable structures 72, 73 are allowed to move integrally with the block 10 while they are rightly held in opposed relation to the latter. As the movable plate 87 moves closer, the ground-side exhaust gas connector 90 is coupled to the table-side exhaust gas connector 13, and the ground-side oil connector 91 is coupled to the table-side oil connector 14; further, the ground-side connector 70 is coupled to the table-side connector 15. Thus, various signals ar exchanged between the individual control sections 66 and the host computer 95 through the connectors 15, 70, transmission cable 2, and interface portion 68. Therefore, transmission of mass test-instructions and decision data from the host computer 95 to the control sections 66, as well as transmission of mass test data from the control sections 66 to the host computer 95, can be made. These are displayed on the display unit 67. Further, through the above said coupling, the exhaust gas in the internal combustion engine 16 is drawn out, and the oil therein is drawn into the duct 75. After test data and other required items are fetched, the cylinder device 88 is driven for contraction, thereby to retreat the movable plate 87 so that the ground-side connectors 90, 91, 70 are disconnected from the table-side connectors 13, 14, 15 and so that the positioning pin 90 is withdrawn from the positioning cylinder 11. Then, the engagement projection 105 is disengaged from the engagement member 12 through contraction movement of the cylinder device 104, the movable structures 72, 73 being thereby made free. Thereupon, the movable structures 72, 73 being thereby made free. Thereupon, the movable structures 72, 73 are driven by the air motor 79 to return to its original position.

The empty carry-out carriage 23 has been moved by the cylinder device 30 to a position most away from the carry-out device 111, and as earlier mentioned, then the carry-in carriage 22 and the turntable 1 are integrally connected, the carry-out carriage 23 is positioned opposite to one testing unit 7 one pitch downstream of the testing unit 7 to which the carry-in carriage 22 is opposed, and goes into integral movement with the turntable 1 through engagement with the engaging device 60 of the carry-out carriage 23. During this integral movement, the load receiving plate 58 of the carry-out carriage 23 operates in the opposite way from the carry-in carriage 22, so that it directly receives the pallet 17 on the pallet receiver 18 and transfers same onto the chain 34. When the pallet 17 is completely withdrawn, the engagement member 64 is retracted so that the carry-out carriage 23 is disconnected from the turntable 1. This disconnection of the carry-out carriage 23 is carried out independently of the disconnection of the carry-in carriage 22. The carry-out carriage 23, made free through this disconnection, is adjusted for forward or reverse movement through operation of the air motor 79 and stopped as it is positioned opposite the carry-out device 111. Then, the transfer device 25 and the carry-out device 111 are driven and the pallet 17 on the carry-out carriage 23 is transferred onto the carry-out device 111. The carry-out carriage 23 which is now empty is moved to a position most remote from the carry-out device 111.

In the above described embodiment, the carry-in carriage 22 and the carry-out carriage 23 are driven to run back and forth by means of the cylinder device 30; but alternatively a run drive device mounted on such carriage may be employed with being interlockingly connected to the wheels 28.

A fork-type transfer system with the carriages 22, 23 is shown in the embodiment, but alternatively a transfer system in the form of a laterally pushing-out or drawing-out device mounted on such carriage may be employed.

In the foregoing embodiment, of the two movable structures 72, 73, one 72 is used for signal transmission and reception, but it is noted that the other 73 is similarly used in case of trouble or failure with the one structure 72.

In the above embodiment, the turntable 1 is continuously rotated, but alternatively it may be of the intermittently rotatable type. In the case where the latter mentioned type is employed, the transfer device 20 and the ground-side connector 70 may be stationary.

In the foregoing embodiment, the connectors 15, 70 are completely coupled for signal transmission and reception, but alternatively it is possible to arrange that the ground-side connector 70 is positioned sufficiently close to the table-side connector so as to permit optical transmission and reception.

In the above described embodiment, the apparatus comprises testing units 7 disposed on the turntable 1 at a plurality of circumferentially spaced locations, each of the testing units 7 having testing means 65, a control section 66 comprising a computer for controlling the testing means 65, and a display unit 67 controlled by the control section 66, table-side connectors 15 disposed at a plurality of locations in a peripheral edge portion of the turntable 1 and individually connected to the control sections 66, ground-side connectors 70 provided outside the turntable which are connectable to and disconnectable from the table-side connectors and which are connected to a host computer 95, whereby at each of the control section 66, test data 116a–116d received from the testing means 65 are, in combination with decision data 115a–115d from the host computer 95 which correspond to the test data 116a–116d, displayed on the display unit 67. When such arrangement is employed, by connecting the table-side connectors and the ground-side connectors together in opposed relation and connecting the individual control sections 66 to the host computer 95, it is possible to exchange various test data signals, decision data signals, and operating signals between the host computer 95 and the control sections 66 on a mass transmission/reception basis. Accordingly, testing can be made on a mass scale and the resulting test data can be displayed on the display unit 67.

What is claimed is:

1. A turntable-using testing apparatus comprising:
a turntable,
testing units disposed at a plurality of circumferential locations on the turntable and individually having computers,
table-side connectors disposed at a plurality of locations in a peripheral edge portion of the turntable and individually connected to said computers,
a transfer device provided outside the turntable for transferring an object to be tested onto one of the testing units and removing the object from the testing unit,
a host computer spaced apart from the turntable, and
a ground-side connector connectable to and disconnectable from the table-side connectors and connected to the host computer.

2. A turntable-using testing apparatus as set forth in claim 1 wherein the transfer device has an arcuate travel path running along the outer periphery of the turntable and is movable integrally with the turntable.

3. A turntable-using testing apparatus as set forth in claim 1 wherein the transfer device comprises a unit for delivering an object to be tested onto one of the testing units and a unit for receiving the object from the testing unit.

4. A turntable-using testing apparatus as set forth in claim 1 wherein the apparatus has a movable structure movable integrally with the turntable along an arcuate travel path running along the outer periphery of the turntable, the ground-side connector being disposed on the movable structure.

5. A turntable-using testing apparatus as set forth in claim 4 wherein the turntable is provided with table-side oil connectors corresponding to the individual testing units and the movable structure is provided with ground-side oil connector connectable to and disconnectable from the table-side oil connectors.

6. A turntable-using testing apparatus as set forth in claim 5 wherein the apparatus has an arcuate duct running along the outer periphery of the turntable, the duct being in communication with the ground-side oil connector.

7. A turntable-using testing apparatus as set forth in claim 4 wherein the turntable is provided With table-side exhaust gas connectors corresponding to individual testing units and the movable structure is provided with ground-side exhaust gas connector connectable to and disconnectable from the table-side exhaust gas connectors.

8. A turntable-using testing apparatus as set forth in claim 1 wherein the each of the testing units has testing means, a control section comprising a computer for controlling the testing means, and a display unit controlled by the control section, each of said testing units being of such arrangement that said control section combines test data inputted from said testing means with decision data with respect to the test data and causes the combined data to be displayed on the display unit.

* * * * *